US009825737B2

(12) United States Patent
Gowda et al.

(10) Patent No.: US 9,825,737 B2
(45) Date of Patent: Nov. 21, 2017

(54) METHOD AND DEVICE FOR DETECTING SECONDARY SYNCHRONIZATION SIGNAL IN LTE AND LTE ADVANCED COMMUNICATION SYSTEM

(71) Applicant: LEKHA WIRELESS SOLUTIONS PVT LTD, Bangalore (IN)

(72) Inventors: Niranjan Mylarappa Gowda, Mysore (IN); Sreenath Ramanath, Bangalore (IN)

(73) Assignee: Lekha Wireless Solutions Pvt Ltd., Bangalore (IN)

( * ) Notice: Subject to any disclaimer, the term of this patent is extended or adjusted under 35 U.S.C. 154(b) by 87 days.

(21) Appl. No.: 14/959,039

(22) Filed: Dec. 4, 2015

(65) Prior Publication Data

US 2016/0165613 A1 Jun. 9, 2016

(51) Int. Cl.
*H04W 56/00* (2009.01)
*H04L 5/00* (2006.01)
*H04J 11/00* (2006.01)

(52) U.S. Cl.
CPC ............ *H04L 5/00* (2013.01); *H04J 11/0076* (2013.01)

(58) Field of Classification Search
CPC ........... H04J 11/0076; H04W 36/0083; H04W 36/08; H04W 36/10; H04W 36/36; H04W 48/20
See application file for complete search history.

(56) References Cited

U.S. PATENT DOCUMENTS

| | | | | |
|---|---|---|---|---|
| 8,416,891 B2 * | 4/2013 | Mansson | ............... | H04B 7/0689 342/463 |
| 8,880,065 B2 * | 11/2014 | Klein | ................... | H04J 11/0073 370/503 |
| 9,264,925 B2 * | 2/2016 | Zhao | ..................... | H04W 24/08 |
| 2009/0207853 A1 * | 8/2009 | Mueller-Weinfurtner | | H04L 27/2647 370/465 |
| 2012/0140862 A1 * | 6/2012 | Fine | ..................... | H04J 11/0076 375/362 |

OTHER PUBLICATIONS

Gowda N. M, Ramanath S, Robust synchronization-signal detection for cell identification in 3GPP LTE and LTE-advanced receivers, Proceedings of the 7th International Conference on Communication Systems and Networks (COMSNETS), Jan. 6-10, 2015, Bangalore, India.

* cited by examiner

*Primary Examiner* — Mohamed Kamara

(57) ABSTRACT

The detection and validation of Secondary Synchronization Signal comprising generating a set of samples by performing DFT operation on a time domain LTE signal, wherein the signal comprising an LTE frame divided into an even half and odd half frame, First and second set of hypotheses from even samples in even and odd half frame are generated and third and fourth set of hypotheses from odd samples in even and odd half frame are generated using first and second hypotheses. Even half frame is selected as start of boundary of the frame when location of the peak of first hypotheses is smaller than that of second hypotheses or location of the peak of fourth hypotheses is smaller than that of third hypotheses. The physical layer cell identity is determined from the locations of the peak of the first, second, third and fourth set of hypotheses averaged over multiple frames.

7 Claims, 8 Drawing Sheets

METHOD AND DEVICE FOR DETECTING SECONDARY SYNCHRONIZATION SIGNAL IN LTE AND LTE ADVANCED COMMUNICATION SYSTEM

CROSS REFERENCES TO RELATED APPLICATIONS

This application claims priority from Indian patent application No. 6170/CHE/2014 filed on Dec. 7, 2014 which is incorporated herein in its entirety by reference.

STATEMENT REGARDING FEDERALLY SPONSORED RESEARCH OR DEVELOPMENT

Not Applicable

COPYRIGHT NOTIFICATION

No Copyright Notification

BACKGROUND

Technical Field

Embodiments of the present disclosure relate generally to a wireless communication system and more specifically to a method and device for detecting Secondary Synchronization Signal in LTE and LTE-Advanced communication system.

Related Art

The 3GPP LTE and LTE-Advanced networks achieve higher data rates, higher user throughput and provide full IP-based functionalities with low latency. The 3GPP LTE and LTE-Advanced networks provide IP based voice, data and multimedia streaming at the speed of at least 100 Mbps. The LTE and LTE-Advanced network represents the LTE and LTE-Advanced protocols deployed on efficient and reliable macro and small cell networks thereby providing ubiquitous connectivity and reliable communication.

In LTE and or LTE advanced, there are 504 unique cell ids (base station ids) and they are generally referred as physical layer cell identities (PLCI). Further PLCI are grouped into 168 physical cell groups (PLCG/$N_{id}^1$) with three physical layer identities (PLI/$N_{id}^2$) in each group. The signals transmitted by the base stations carry physical layer cell identities and physical layer cell groups. The part of the signal carrying PLCG is generally referred to as secondary synchronisation signal (SSS). The part of the signal carrying PLI is referred to as primary synchronisation (PSS).

In LTE communication network, the user equipment (UE) performs cell search and synchronization in order to establish a reliable link with a base station (BS). During cell search, the user equipment uses the PSS and SSS to identify the strongest base station ID and frame boundaries and to detect the physical layer cell identities.

SUMMARY

According to one aspect, the detection and validation of Secondary Synchronization Signal comprising generating a set of samples by performing a DFT operation on a time domain LTE signal, wherein the signal comprising an LTE frame divided into an even half and odd half frame, separating the set of samples in to even samples, odd samples. Further first and second set of hypotheses from even samples in even and odd half frame are generated and third and fourth set of hypotheses from odd samples in even and odd half frame are generated using first and second hypotheses.

According to another aspect, even half frame is selected as start of boundary of the frame when location of the peak of first hypotheses is smaller than that of second hypotheses or location of the peak of fourth hypotheses is smaller than that of third hypotheses.

According to yet another aspect, the physical layer cell identity ($N_{id}^1$) is determined from the locations of the peak of the first, second, third and fourth set of hypotheses averaged over multiple frames.

Several aspects are described below, with reference to diagrams. It should be understood that numerous specific details, relationships, and methods are set forth to provide a full understanding of the present disclosure. One skilled in the relevant art, however, will readily recognize that the present disclosure can be practiced without one or more of the specific details, or with other methods, etc. In other instances, well-known structures or operations are not shown in detail to avoid obscuring the features of the present disclosure.

DETAILED DESCRIPTION

Figure 1:
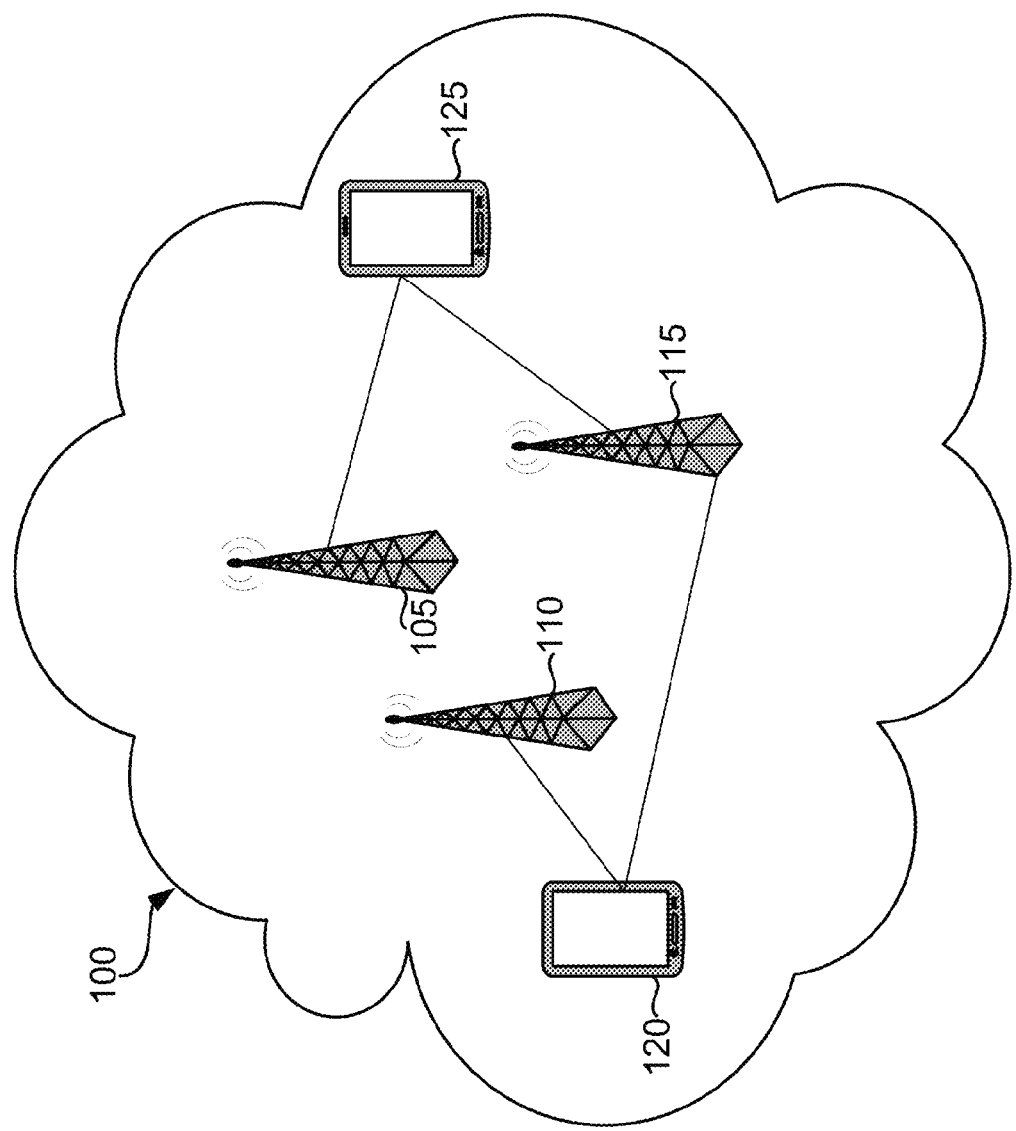
FIG. 1 is an example environment in which various aspects of the present disclosure may be seen.

FIG. 1 is an example environment in which various aspects of the present disclosure may be seen. As shown, the environment may comprise, for example, LTE network 100, user equipments (mobile stations) 120 and 125, base stations 105 through 115. Each base station 105 through 115 may be configured to provide a communication over a geographical region and referred to as cells. The LTE network 100 deployed over the cells allows the user equipment 120/125 to receive signals from the base stations 105/110/115.

In a cellular network, the cells are identified by their cell ids. The BS 105/110/115 transmits synchronisation signals in every radio frame to facilitate cell search on the UE 120/125. During cell search, UE 120/125 uses the PSS and SSS signals to acquire timing information, frequency synchronisation, and to detect cell id of the cell. In one embodiment, the UE determines and validates SSS. The manner in which the SSS may be determined and validated is further described below by first describing the LTE FDD frame and LTE TDD frame configurations for continuity.

Figure 2A:
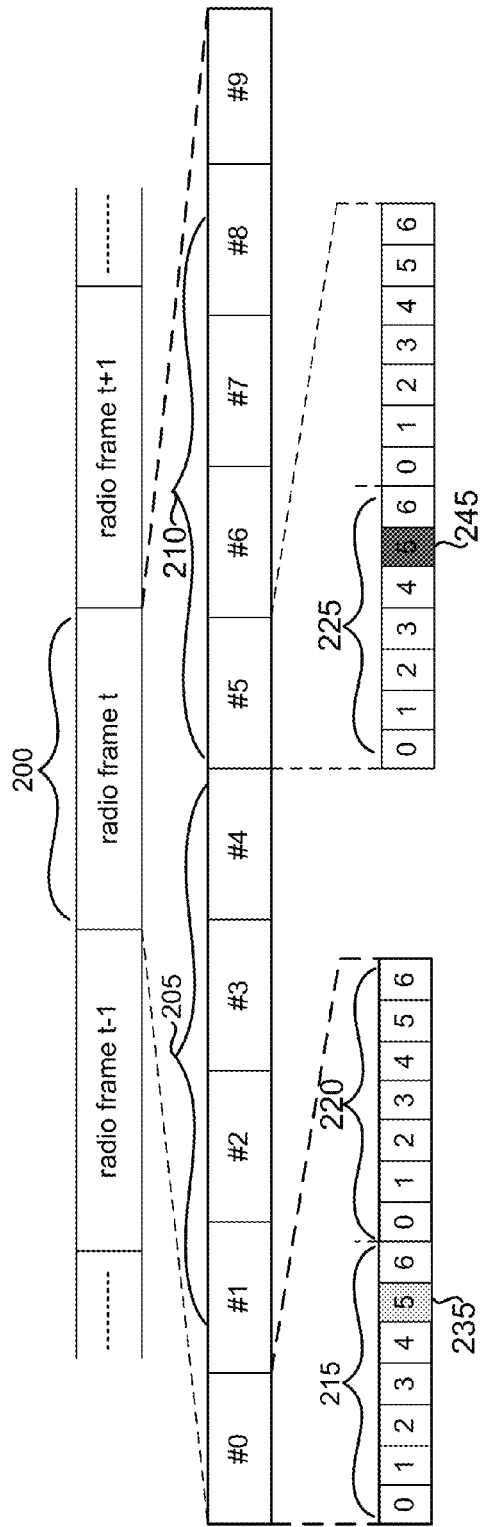
FIG. 2A depicts example 10 ms radio FDD frame adapted in the downlink transmissions of normal CP (cyclic prefix)-LTE communication system.

FIG. 2A depicts example 10 ms radio FDD (Frequency Division Duplex) frame adapted in the downlink transmissions of normal CP (cyclic prefix)-LTE communication system. The 10 ms frame 200 is divided into two half frames 205 and 210. The length of the half frame 205/210 is 5 ms. The LTE half frames 205 and 210 are further divided into five subframes each 1 ms long. The 1 ms subframe is further subdivided into two slots 215 and 220. Thus each frame comprises 20 slots and referred by the order starting from 0 to 19 as is well known in the art. The number of OFDM symbols in each slot in normal-CP (cyclic prefix) mode is 7.

In FDD and normal-CP based LTE, secondary synchronisation signals 235 and 245 are inserted in the fifth symbol of 0th slot 215 and 10th slot 225 of every frame. The secondary synchronisation signals 235 and 245 inserted in the $0^{th}$ slot 215 and $10^{th}$ slot 225 carry different information. The SSS are length-62 sequences mapped on central 62 subcarriers about dc subcarrier. The SSS are constructed by interleaving two length-31 m-sequences scrambled with other distinct m-sequence/sequences. For further details on the construction of SSS, readers are directed to the standard 3GPP TS 36.211 which is incorporated herein by reference. The LTE TDD frame configuration is described below.

Figure 2B:
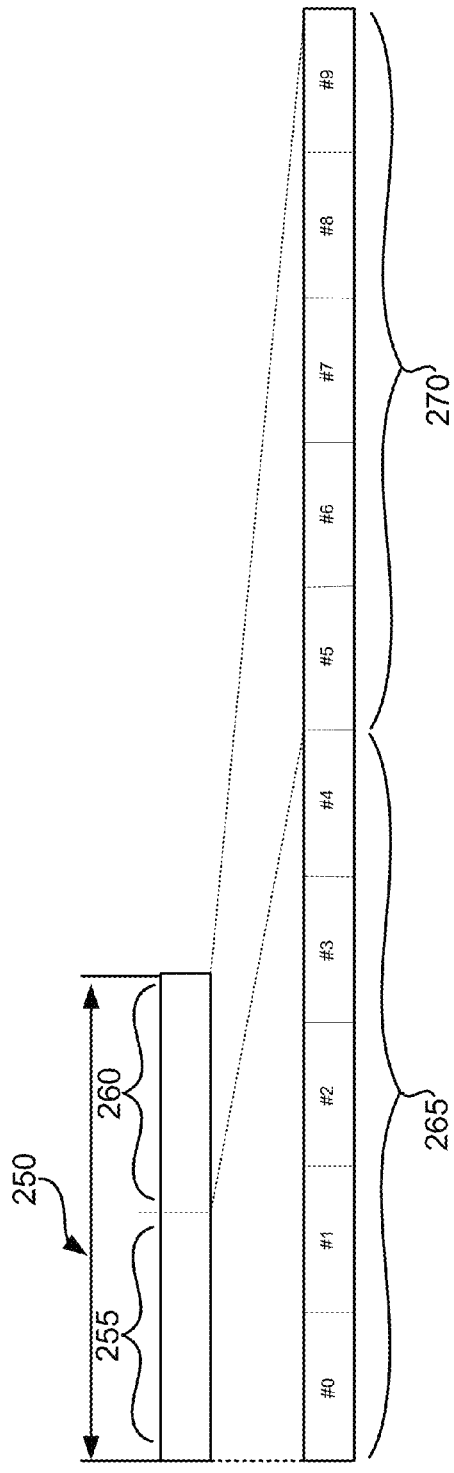
FIG. 2B depicts example 10 ms radio TDD frame adapted in the downlink transmissions of normal CP (cyclic prefix)-LTE communication system.

FIG. 2B depicts example 10 ms radio TDD frame adapted in the downlink transmissions of normal CP (cyclic prefix)-LTE communication system. The 10 ms frame 250 comprises two half frames 255 and 260. Each half frame is subdivided into five subframes (0-4) 265 and (5-9) 270. The length of each subframe is 5 ms and the subframes carry 14 OFDM symbols. In TDD and normal CP based LTE, SSS is the last symbol of subframe #0.

Continuing further with reference to the detection of SSS for the FDD frame, the manner in which SSS may be detected and validated according to present disclosure is described below in further detail.

Figure 3:
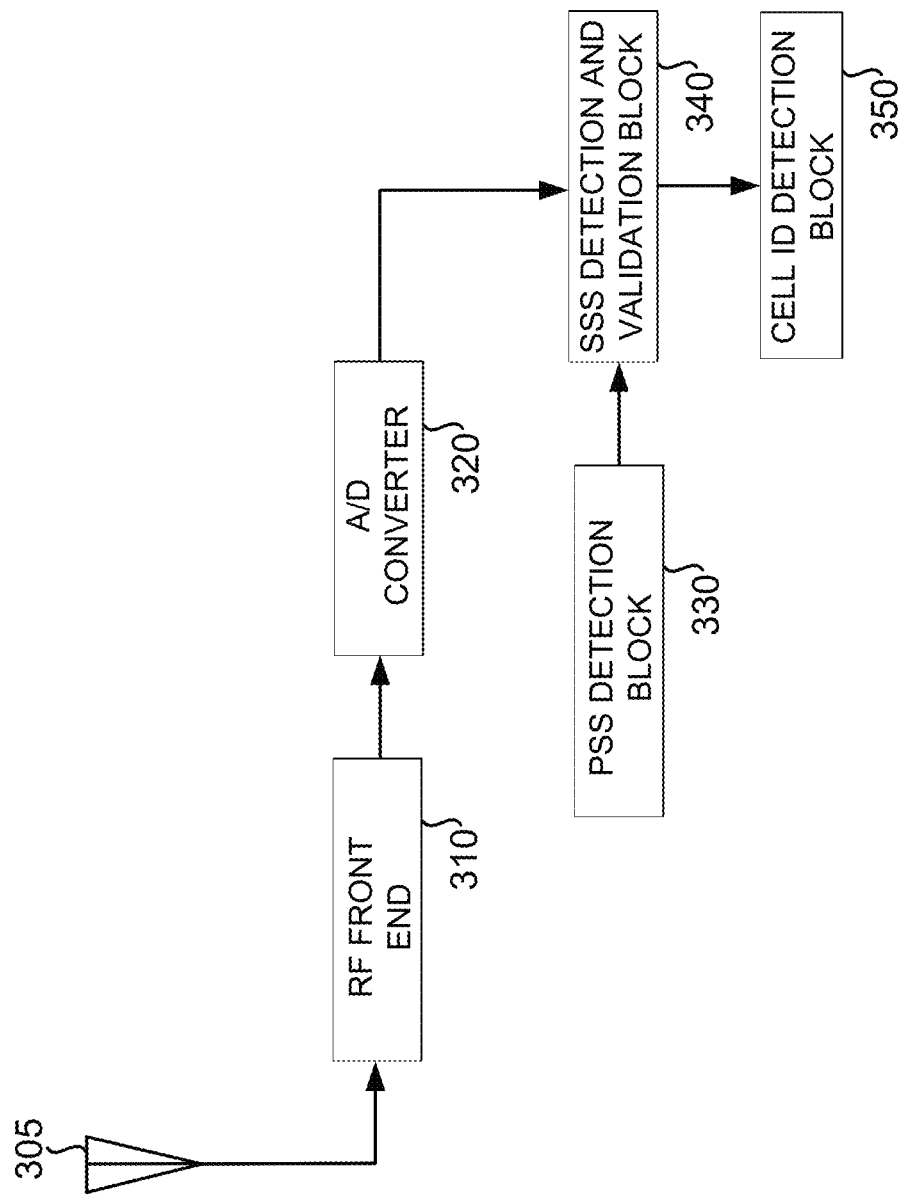
FIG. 3 is an exemplary receiving device in one embodiment.

FIG. 3 is an exemplary receiving device in one embodiment. The receiving device is shown comprising an antenna 305, RF receiver 310, analog to digital converter (A/D) 320, PSS detection block 330, SSS detection block 340, cell id detection block 350. Each block is described below in detail.

The antenna 305 (may be multiple antennas in case of MIMO receiving configuration or single antenna) may be configured to receive a RF signal from the base station. The received RF signal may be provided to the RF port/RF receiver 310. The bandwidth of the received signal may be 20, 15, 10, 5, 3, 1.4 MHz. The system bandwidth may be represented in master information block MIB (information broadcasted by the LTE eNodeB). The MIB is transmitted using a physical channel PBCH (Physical broadcast channel) on downlink. The MIB is extracted by decoding PBCH after synchronisation. Thus, RF front end 310 may be aware of the signal bandwidth after synchronisation.

The analog to digital converter (A/D) 320 converts analog signal into digital form. The A/D converter chips may include some of the support circuitry such as clock oscillator for the sampling clock, reference, the sample and hold function and output data latches. The clock (sampling clock) input to the A/D converter 320 may be provided from a local oscillator. The accuracy of the sampling clock is critical in the operation of the A/D converter 320. The A/D converter 320 may be defined by its bandwidth (data rate). Thus, A/D converters 320 may be selected based on the bandwidth and required signal to noise ratio of the signal to be quantized.

The PSS detection block 330 performs the PSS detection using any known techniques. After successful detection of PSS, the 31 length sequences $c_0$ and $c_1$ are derived from the PSS and the sequences $c_0$ and $c_1$ may be provided to the SSS detection block to detect SSS. Also detected physical layer identity ($N_{id}^2$) may be provided to cell id detection block 350.

In SSS detection block 340, one of 168 SSS sequences is detected after the determination of PSS and the determined SSS provides the cell group identity ($N_{id}^1$/PLCG). In SSS detection block 340, the odd and even samples of the half frames may be descrambled with the 31 length sequences derived from the PSS detection block 330. The hypotheses are generated from odd and even samples by correlating the descrambled even and odd sequences with the basic sequence $s_0(n)$. The generated hypotheses may be used to detect and validate PLCG/$N_{id}^1$ and frame boundary. The determined cell group identity ($N_{id}^1$) may be provided to the cell id detection block 350.

In the cell id detection block 350, the UE is enabled to establish the cell identity of the base stations by using the sector id ($N_{id}^2$) provided by the PSS detection block 330 and the cell group identity ($N_{id}^1$) provided by the SSS detection block 340. The cell identity detection may be represented by the relation:

$$N_{id}^c = 3 * N_{id}^1 + N_{id}^2 \qquad (1)$$

in which, $N_{id}^c$ represents the cell identity of the base station. The manner in which the SSS detection block may detect and validate SSS is further described in detail below.

Figure 4:
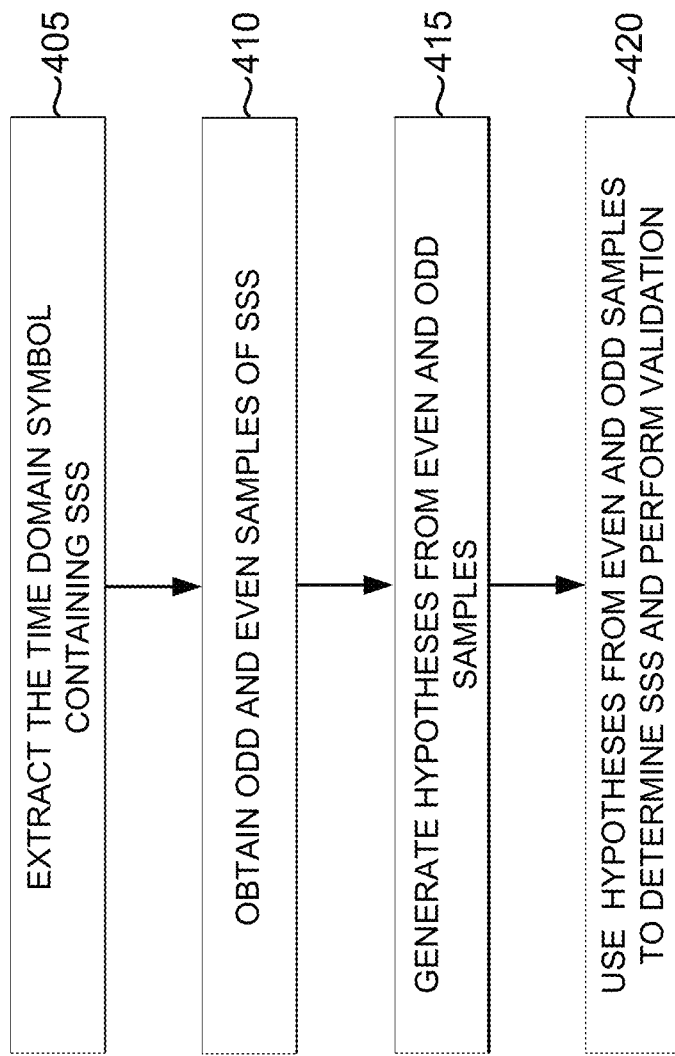
FIG. 4 is a flowchart illustrating the manner in which SSS may be determined and validated in one embodiment.

FIG. 4 is a block diagram illustrating the manner in which SSS may be determined and validated in one embodiment. In block 405, the user equipment extracts the time domain LTE symbol containing SSS. The extracted time domain symbol containing SSS may be transformed into frequency domain by performing suitable DFT on time domain symbol.

In block 410, the SSS detection block/detector 340 obtains even and odd samples. The central portion of the DFT may be segregated into even and odd samples. Further even and odd samples may be descrambled with the 31 length binary sequences $c_0$ and $c_1$ derived from the detected PSS.

In block 415, the detector 340 generates the hypotheses from even and odd samples. The descrambled even samples may be cross correlated with the basic sequence $s_0(n)$ to generate the hypotheses for even samples. A location with respect to 31 length basic sequence $s_0(n)$ at which the value of the hypothesis is highest (peak) is noted/estimated. The location of the peak derived from even samples in the even numbered frame and location of the peak derived from even samples in the odd numbered frame are represented by $m_{0\_e}$, and $m_{1\_e}$, respectively. Thus, location of the peak may take value from 0 to 30 corresponding to one of the 31 positions of the basic sequence.

The estimated locations of the peak may be used to generate 31 length sequences $z_0$ and $z_1$. Further, the generated $z_0$ and $z_1$ sequences may be cross correlated with the descrambled odd samples to generate hypotheses from the odd samples.

In block 420, the detector 340 determines the SSS and performs validation by using the hypotheses generated from the even and odd samples. The SSS may be determined from the hypotheses generated from the even samples thus by detecting $N_{id}^1$/PLCG and frame boundary. The detected frame boundary and PLCG/$N_{id}^1$ may be validated by using the hypotheses generated by the odd samples for the successful detection of SSS. The post cell search verification may be eliminated by performing validation on the determined SSS. The manner in which SSS may be determined is described further in detail below.

Figure 5:
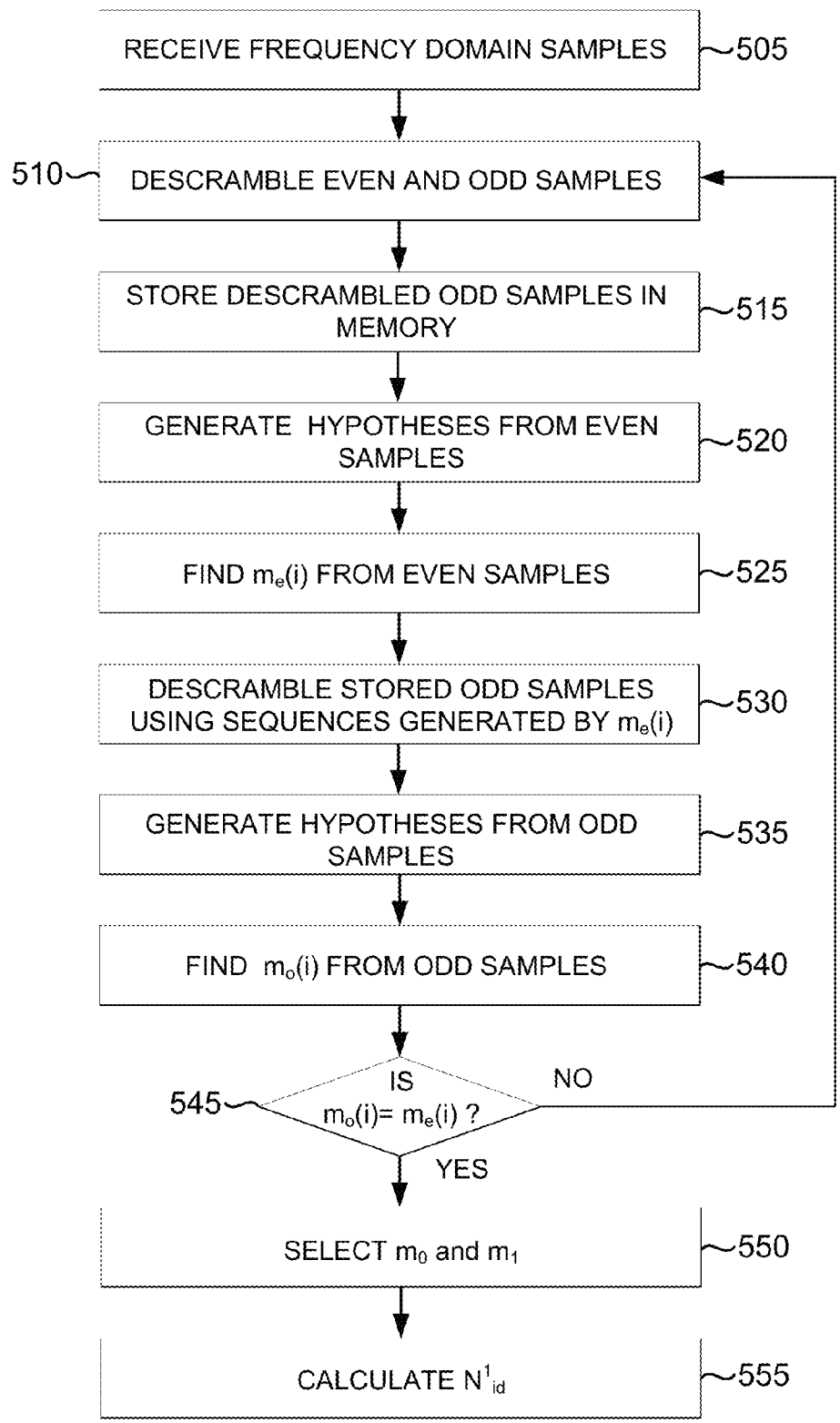
FIG. 5 is a block diagram further describing the detection of SSS in one embodiment.

FIG. 5 is a block diagram further describing the detection of SSS in one embodiment. In block 505, the UE extracts the transmitted time domain signal containing SSS by the BS. Further the UE performs DFT on the received time domain signal to segregate SSS into odd and even samples. The samples extracted from the central 62 subcarriers around dc subcarrier from the SSS symbol of the $l^{th}$ half frame may be represented by the relation:

$$R_s^l(n): n=0,1,\ldots 61 \tag{2}$$

in which, $R_s^l(n)$ represents the received samples.

In block 510, the detector 340 descrambles even and odd samples. The even samples and odd samples may be descrambled with the 31 length binary sequences $c_0$ and $c_1$ respectively. The sequences $c_0$ and $c_1$ are derived from the detected PSS. The descrambled even and odd samples may be represented by the relation:

$$Y_i^l(n) = R_s^l(2n+i)c_i(n) \tag{3}$$

in which, $Y_i^l(n)$ represents the descrambled samples and $i \in \{0,1\}$

In block 515, the detector 340 stores the odd descrambled samples in memory. The samples stored in the memory may be used for verification/validation of detected SSS.

In block 520, the detector 340 generates the hypotheses from the even samples. The descrambled even samples may be cross correlated with the basic sequence $s_0(n)$ to form the hypotheses. The hypotheses generated from the even samples of $l^{th}$ half frame may be represented by the relation:

$$h_l^e(n) = \Sigma_{m=0}^{30} Y_0^l(m) s_o((m+n) \bmod(31)) \tag{4}$$

in which, $h_l^e(n)$ represents the hypotheses generated from even samples of $l^{th}$ half frame, $Y_0^l(m)$ represents the descrambled even samples, $s_o((m+n) \bmod(m+n))$ represents the cyclically shifted version of basic sequence represented as $\tilde{s}$ and n varies from 0 to 30.

In block 525, the detector 340 selects the locations of the peak $(m_e(i)/(m_{0\_e}, m_{1\_e}))$ from the hypotheses of the even samples. The hypotheses generated from the even samples of each frame may be averaged over multiple frames to select the two locations of the peak $(m_{0\_e}, m_{1\_e})$ in the two averaged hypotheses from even and odd numbered half frames respectively.

In a conventional UE, the received SSS sequences are divided into $s_0$ and $s_1$ according to their even and odd samples respectively. The sequence $s_0$ is selected and descrambled with the 31 length sequence $c_0$ from the detected PSS. The descrambled sequence is correlated to obtain the highest location of the peak from the even sequence $s_0$. The selected locations of the peak from the even sequence $s_0$ is provided to the decision device. The odd sequence $s_1$ is descrambled with the 31 length sequence $z_{1,j}(m)$, where $z_{1,j}(m)$ represents the cyclically shifted version of the basic sequence $z_0(n)$. Further the descrambled sequence is descrambled with the 31 length sequence $c_1$ which is derived from the detected PSS. The descrambled sequence is cross correlated with the basic sequence $s_0(n)$ to obtain the location of the highest peak from the odd SSS sequence. The selected location of the peak from the odd sequence $s_1$ is provided to the decision device. The decision device receives the locations of the peak from the odd sequence and even sequence of SSS and detects the cell group identity ($N_{id}^1$/PLCG). Thus, in the conventional systems, even and/or odd sequences of SSS are used only to detect the cell group identity ($N_{id}^1$/PLCG). Thus requiring additional authentication/verification stage.

In one embodiment of the present invention, the additional authentication/verification stage may be eliminated by comparing the hypotheses generated from the odd samples with the hypotheses generated from the even samples for the successful detection of SSS.

Continuing further with reference to FIG. 5, in block 530, the detector 340 descrambles the stored odd samples using the sequences generated from the locations of the peak of hypotheses from even samples. The detector generates the 31 length binary sequence $z_{m_{e(i)}}(n)$ using the selected locations of the peak from the even samples where $m_e(0) = m_{0\_e}$ and $m_e(1) = m_{1\_e}$ and $i \in \{0,1\}$ where 0 represents the even numbered half frame and 1 represents the odd numbered half frame. The sequence $z_{m_{e(i)}}(n)$ is the cyclically shifted version of basic sequence $\tilde{z}(n)$ by $m_e(i) \bmod(8)$ number of shifts. The stored odd samples may be descrambled with the generated sequence $z_{m_{e(i)}}(n)$.

In block 535, the detector 340 generates the hypotheses from the odd samples. The descrambled odd samples may be cross correlated with the sequence $s_0(n)$ to form the hypotheses. The hypotheses generated from the odd samples of $l^{th}$ half frame may be represented by the relation:

$$h_l^o(n) = \Sigma_{m=0}^{30} Y_1^l(m) z_{m_{e(i)}}(n) s_0((m+n) \bmod(31)) \tag{5}$$

in which, $z_{m_{e(i)}}(n)$ represents the cyclically shifted version of the basic sequence $\tilde{z}(n)$ by $m_e(i) \bmod(8)$ number of shifts, l represents the half frame and $i \in \{0,1\}$ where the value of i may be 0 for even half frame and the value of i may be 1 for odd half frame.

In block 540, the detector 340 selects the locations of the peak $(m_o(i)/(m_{0\_o}, m_{1\_o}))$ from the hypotheses of the odd samples. The hypotheses generated from odd samples of each half frame may be averaged over multiple half frames to select the two locations of the peak $(m_{0\_o}, m_{1\_o})$ in the two averaged hypotheses from odd and even half frames respectively.

In block 545, the detector 340 checks that whether the locations of the peak calculated from the even samples match with the location of the peak selected from the odd samples. If the locations of the peak selected from even samples and odd samples are not equal then the operations in the blocks 510 through 545 may be repeated to detect $N_{id}^1$. If the locations of the peak selected from the even samples and odd samples are equal then in block 550, the detector 340 selects the maximum $m_1$ and minimum $m_0$ of the locations of the peak among the locations of the peak detected from the even samples to detect the frame boundary and $N_{id}^1$.

In block 555, the detector calculates the cell group identity $N_{id}^1$. The $N_{id}^1$ may be calculated by the relation:

$$N_{id}^1 = \frac{(\Delta - 1)(62 - \Delta)}{2} + m_0 \tag{6}$$

in which, $\Delta = m_1 - m_0$ represents the difference between the selected locations of the peak from the even samples and $m_0$ represents the number of shifts in the basic sequence. The manner in which the hypotheses may be generated from even samples is described further in detail below.

Figure 6:
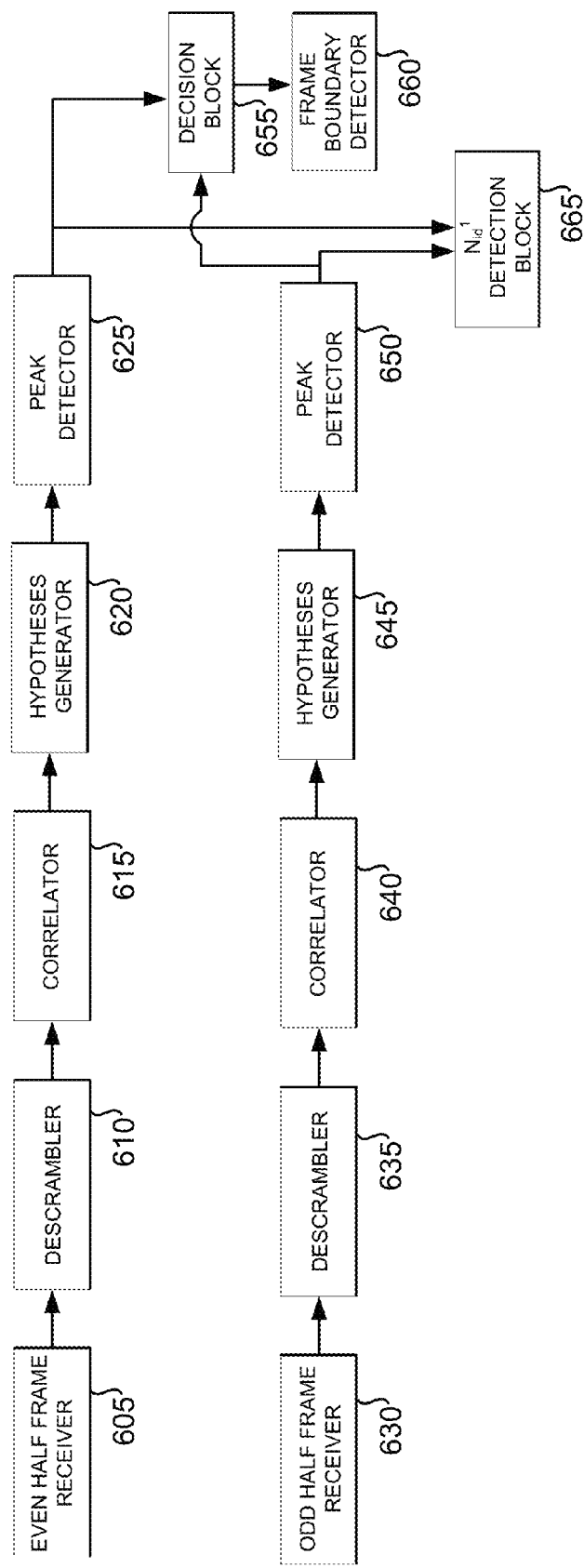
FIG. 6 is a block diagram illustrating the manner in which hypotheses may be generated from the even samples in one embodiment.

FIG. 6 is a block diagram illustrating the manner in which hypotheses may be generated from the even samples in one embodiment. As shown, FIG. 6 comprises Even half frame receiver 605, Odd half frame receiver 630, descramblers 610 and 635, correlators 615 and 640, hypotheses generators 620 and 645, peak detectors 625 and 650, decision block 655, frame boundary detector 660, cell identity detection block/ $N_{id}^1$ detection block 665. The function of each block is described in detail below.

The UE extracts the transmitted time domain signal containing SSS by the BS. Further the UE performs DFT on the received time domain signal to segregate SSS into odd $s_1$ and even samples $s_0$. The Even half frame receiver 605 receives the even samples $s_0$ from the multiple even numbered half frames. The even samples received from the even numbered half frames may be provided to the descrambler 610. The Odd half frame receiver 630 receives the even samples from the multiple odd numbered half frames. The even samples received from the odd numbered half frames may be provided to the descrambler 635.

The descrambler 610 descrambles the even samples with the 31 length binary sequence $c_0$ The 31 length binary sequence $c_0$ may be generated from $N_{id}^2$ (from PSS detection block). The 31 length binary sequence $c_0$ may be used as reference sequence to descramble the received even samples from the even numbered and odd numbered half frames. The descrambler 635 descrambles the even samples from the odd numbered half frames with $c_0$. The output of the descramblers 610 and 635 may be provided to the correlators 615 and 640 respectively.

The correlator 615 may be used to cross correlate the descrambled even samples of the even numbered half frames with the sequence $s_0(n)$. Similarly the correlator 640 may be used to cross correlate the descrambled even samples of the odd numbered half frames with the sequence $s_0(n)$.

The outputs of the correlators 615 and 640 may be referred as hypotheses (correlation results). The hypotheses generator 620 averages the hypotheses generated from the even samples over the multiple even numbered half frames. Similarly the hypotheses generator 645 averages the hypotheses generated from the even samples over the multiple odd numbered half frames.

The peak detector 625 selects the location of the highest peak $p0/m_{0\_e}$ over the averaged hypotheses generated from the even samples of even numbered half frames. Similarly the peak detector 650 selects the location of the highest peak $p1/m_{1\_e}$ over the averaged hypotheses generated from the even samples of odd numbered half frames. The location of the peak selected may be represented by the relationship:

$$m_e(i) = \underset{n}{\operatorname{argmax}} \{h_i^e(n)\} \quad (7)$$

in which, $h_i^e(n)$ represents the averaged hypotheses generated from the even samples and $i \in \{0,1\}$ where 0 represents the even numbered half frame and 1 represents the odd numbered half frame.

The locations of the peak selected from the even numbered and odd numbered half frames may be provided to the decision block 655. Alternatively the selected locations of the peak may be provided to the $N_{id}^1$ detection block 665. In $N_{id}^1$ detection block 665, the maximum and minimum peak locations are selected among the locations of the peak p0 and p1 selected from the even numbered and odd numbered half frames. The selection of m0 and m1 may be represented by the relation:

$$m_0 = \min(p0, p1) \quad (8)$$

$$m_1 = \max(p0, p1) \quad (9)$$

In decision block 655, the locations of the peak $p0/m_{0\_e}$ and $p1/m_{1\_e}$ obtained from the even samples of the even numbered and odd numbered half frames may be compared to detect the frame boundary. If p0>p1, the frame boundary detector 660 detects that the frame boundary lies in odd numbered half frame, otherwise the frame boundary may lie in even numbered half frame. Further the locations of the peak obtained from the even samples may be used to compare with the locations of the peak generated from the odd samples for the successful detection of PSS. The manner in which the hypotheses may be generated from the odd samples is described in detail below.

Figure 7:
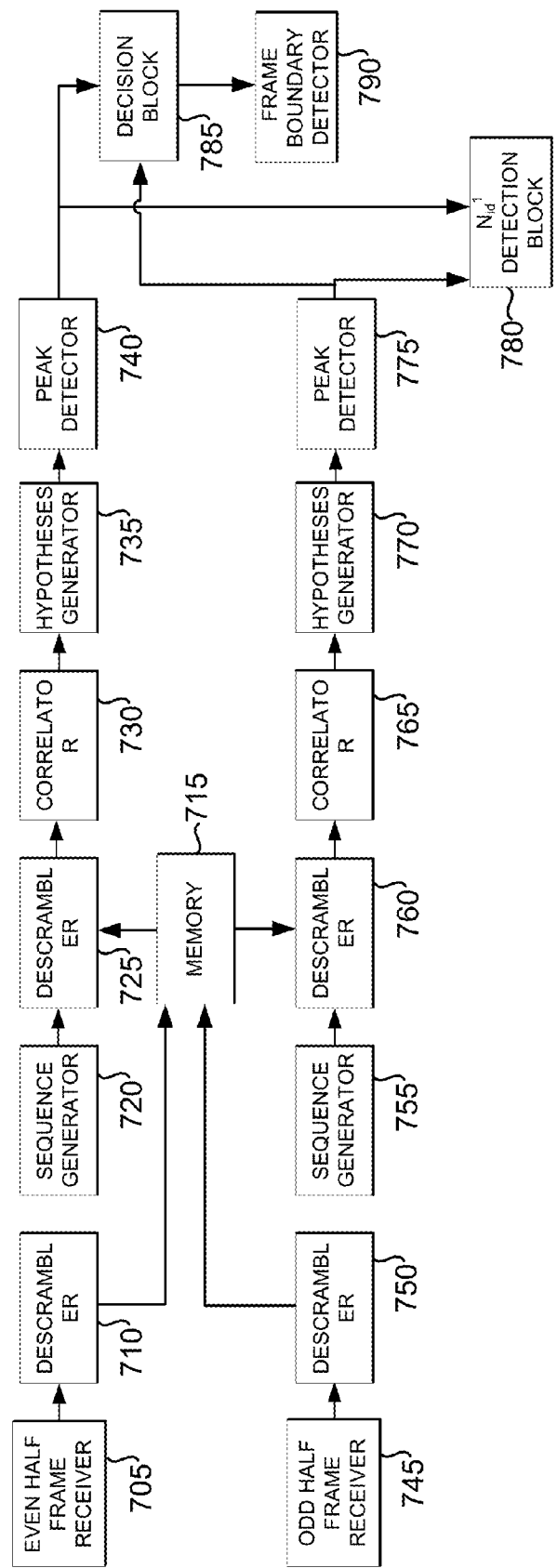
FIG. 7 is a block diagram illustrating the manner in which hypotheses may be generated from the odd samples in one embodiment.

FIG. 7 is a block diagram illustrating the manner in which hypotheses may be generated from the odd samples in one embodiment. As shown, FIG. 7 comprises Even half frame receiver 705, Odd half frame receiver 745, descramblers 710, 750, 725 and 760, sequence generators 720 and 755, correlators 730 and 765, memory 715, hypotheses generators 735 and 770, peak detectors 740 and 775, decision block 785, frame boundary detector 790, $N_{id}^1$ detection block 780. The function of each block is described in detail below.

The Even half frame receiver 705 receives the odd samples $s_0$ from the multiple even numbered half frames. The odd samples received from the even numbered half frames may be provided to the descrambler 710. The Odd half frame receiver 745 receives the odd samples from the multiple odd numbered half frames. The odd samples received from the odd numbered half frames may be provided to the descrambler 750.

The descrambler 710 descrambles the odd samples with the 31 length binary sequence $c_1$. The 31 length binary sequences $c_1$ may be generated from $N_{id}^2$ (from PSS detection block). The 31 length binary sequence $c_1$ may be used as reference sequence to descramble the received odd samples from the even numbered and odd numbered half frames. The descrambler 750 descrambles the odd samples from the odd numbered half frames with $c_1$. The output of the descramblers 710 and 750 may be stored in the memory. The descrambled sequence stored in the memory 715 may be used for the SSS verification stage in one embodiment.

The sequence generator 755 generates the sequence $z_{m_{e(1)}}(n)$ using the location of the peak $m_{1\_e}$ obtained from the even samples. The generated sequence $\tilde{z}_{m_{e(1)}}(n)$ is the cyclically shifted version of the basic sequence $\tilde{z}(n)$ by $m_{1\_e}$ mod(8) number of shifts. Similarly the sequence generator 720 generates the sequence $z_{m_{e(0)}}(n)$ using the location of the peak $m_{0\_e}$ obtained from the even samples. The generated sequence $z_{m_{e(0)}}(n)$ is the cyclically shifted version of the basic sequence $\tilde{z}(n)$ by $m_{0\_e}$ mod(8) number of shifts. The descrambler 725 further descrambles the descrambled odd samples from even numbered half frames stored in the memory with the generated sequence $z_{m_{e(0)}}(n)$. Similarly the descrambler 760 again descrambles the descrambled odd samples from odd numbered half frames stored in the memory with the generated sequence $z_{m_{e(1)}}(n)$.

The correlator 730 may be used to cross correlate the descrambled odd samples of the even numbered half frames with the sequence $s_0(n)$. Similarly the correlator 765 may be used to cross correlate the descrambled odd samples of the odd numbered half frames with the sequence $s_0(n)$.

The outputs of the correlators 730 and 765 may be referred as hypotheses (correlation results). The hypotheses generator 735 averages the hypotheses generated from the odd samples over the multiple even numbered half frames. Similarly the hypotheses generator 770 averages the hypotheses generated from the odd samples over the multiple odd numbered half frames.

The peak detector 740 selects the location of the highest peak $p1/m_{1\_o}$ over the averaged hypotheses generated from the odd samples of the even numbered half frames. Similarly the peak detector 775 selects the location of the highest peak p0/$m_{0\_o}$ over the averaged hypotheses generated from the odd samples of the odd numbered half frames. The location of the peak selected may be represented by the relation:

$$m_o(0) = \underset{n}{\mathrm{argmax}} \{h_1^o(n)\} \quad (10)$$

$$m_o(1) = \underset{n}{\mathrm{argmax}} \{h_0^o(n)\} \quad (11)$$

in which, $h_i^o(n)$ represents the averaged hypotheses generated from the odd samples and i∈{0,1} where 0 represents the even numbered half frame and 1 represents the odd numbered half frame.

The locations of the peak selected from the even numbered and odd numbered half frames may be provided to the decision block 785. Alternatively the selected locations of the peak may be provided to the Nid1 detection block 780. In Nid1 detection block 780, the maximum and minimum peak locations are selected among the locations of the peak p1 and p0 selected from the even numbered and odd numbered half frames respectively. The selection of $m_0$ and $m_1$ may be represented by the relation:

$$m_0 = \min(p0, p1) \quad (11)$$

$$m_1 = \max(p0, p1) \quad (12)$$

In decision block 785, the locations of the peak p0 and p1 obtained from the odd numbered and even numbered half frames may be compared to detect the frame boundary. If p0<p1, the frame boundary detector 790 detects that the frame boundary lies in even numbered half frame, otherwise the frame boundary may lie in odd numbered half frame. Further the locations of the peak obtained from the odd samples may be compared with the locations of the peak obtained from the even samples for the verification of SSS. The manner in which the SSS detection may be verified by using the selected locations of the peak from even samples and odd samples is described in detail below.

Figure 8:
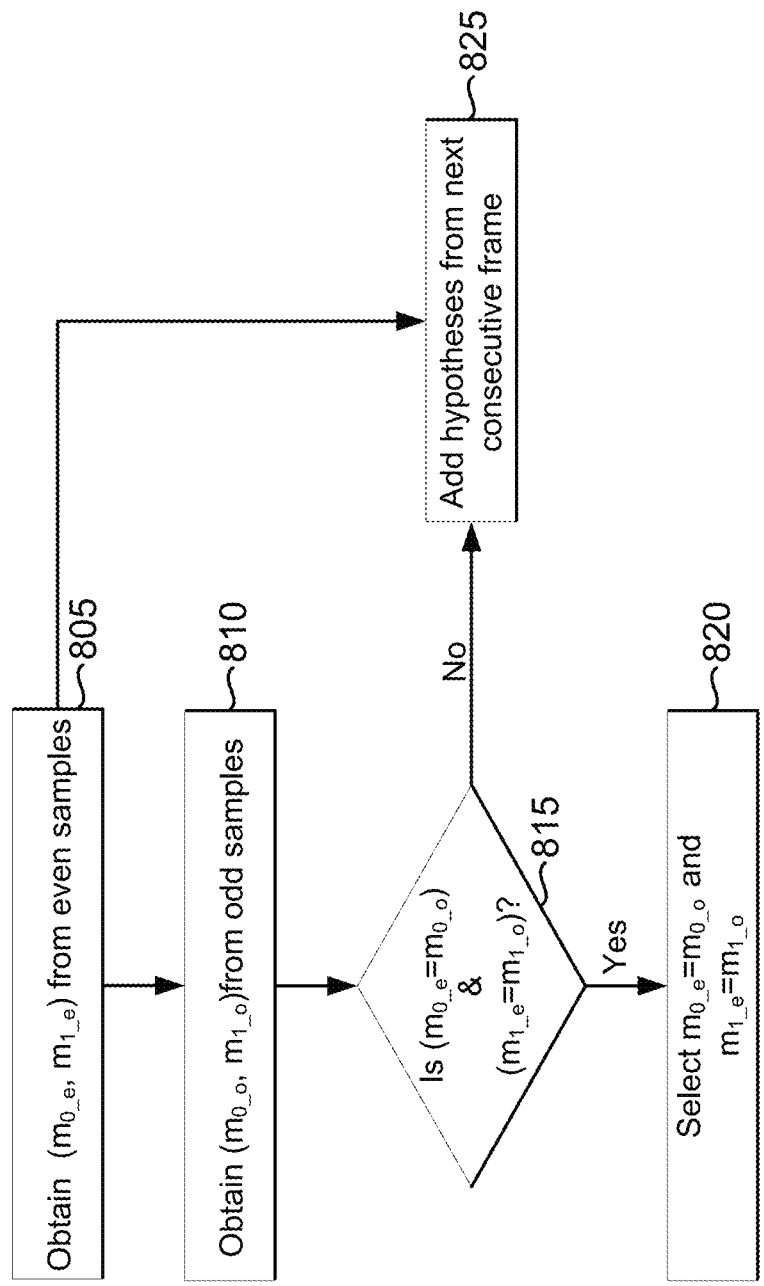
FIG. 8 is a flowchart illustrating the manner in which SSS detection may be verified in one embodiment.

FIG. 8 is a flowchart illustrating the manner in which SSS detection may be verified in one embodiment. In block 805, the detector 340 obtains the locations of the peak selected from the even samples. The locations of the peak $m_{0\_e}$ and $m_{1\_e}$ may be selected (as described in FIG. 6) over the averaged hypotheses generated from the even samples of even numbered and odd numbered half frames respectively.

In block 810, the detector 340 obtains the locations of the peak selected from the odd samples. The locations of the peak $m_{0\_o}$ and $m_{1\_o}$ may be selected (as described in FIG. 7) over the averaged hypotheses generated from the odd samples of odd numbered and even numbered half frames respectively.

In block 815, the detector 340 checks whether the locations of the peak obtained from the even samples of the even numbered and odd numbered half frames matches with the locations of the peak obtained from the odd samples of odd numbered and even numbered half frames respectively. If the locations of the peak obtained from the even samples and odd samples matches then in block 820, the location of the peak $m_0$ may be selected as the location of the peak obtained from the even samples of even numbered half frames. The location of the peak $m_1$ may be selected as the location of the peak obtained from the even samples of odd numbered half frames. The locations of the peak selected may be used to detect frame boundary and cell group identity $N_{id}^1$ as described in (FIG. 5 and FIG. 6).

If the locations of the peak obtained from the even samples and odd samples are not equal, then in block 825, the detector 340 adds the hypotheses from the next consecutive half frame to select the locations of the peak. The detector receives the next consecutive half frame and the operations described in the blocks of FIG. 6 may be repeated to generate the hypotheses from the even samples. The locations of the peak may be selected over the averaged hypotheses from the even samples to compare with the locations of the peak obtained from the odd samples stored in the memory. The comparison of the locations of the peak may be repeated by the detector 340 till the locations of the peak obtained from the even samples and odd samples are equal, otherwise the comparison may continue until some threshold value may be satisfied in one embodiment. After reaching the threshold value (for example the comparison may be performed for eight half frames), if locations of the peak obtained from the even samples and odd samples are not equal, then the detection of SSS and cell search may be declared unsuccessful.

In contrast, a conventional UE/receiving device performs post cell search verification by decoding the pilot signals. The pilot signals are derived from the estimated cell id. The pilot signals derived from the cell id are correlated with the locally generated pilot signals. The location of the peak is selected over the correlation result. The receiving device uses some threshold value to check whether the cell search is successful or not. If selected location of the peak is greater than the threshold value then the receiver declares that the cell search is successful.

Continuing further with reference to FIG. 8, the cell search verification may be performed by the detector 340 in parallel with the detection of frame boundary and $N_{id}^1$. In one embodiment, the detector 340 determines the SSS and performs validation by using the hypotheses generated from the even and odd samples to eliminate the additional post cell search verification.

In cell search verification, the number of frames over which hypotheses are averaged may be adaptive. The cell search verification method depends on channel and noise conditions. When the channel conditions are good, the cell search verification stage takes very few frames to conclude and under bad channel condition hypotheses are averaged over sufficient number of frames until the decision is reliable.

While various examples of the present disclosure have been described above, it should be understood that they have been presented by way of example, and not limitation. Thus, the breadth and scope of the present disclosure should not be limited by any of the above described examples, but should be defined in accordance with the following claims and their equivalents.

What is claimed is:

1. A method of detecting Secondary Synchronization Signal in a receiver device connected to an LTE network, comprising:

receiving an LTE signal comprising a plurality of LTE frames each divided into a first half part and a second half part;

performing a Discrete Fourier Transform (DFT) operation on the LTE signal to generate a set of samples comprising an even numbered samples and an odd numbered samples;

generating a first subset of samples and a second subset of samples from the even numbered samples such that the first subset of samples are from the first half part and the second subset of samples are from the second half part;

correlating the first subset of samples with a first basic sequence to generate a first set of correlation values, and correlating the second subset of samples with the first basic sequence to generate a second set of correlation values;

generating a first and a second reference samples from the first and the second set of correlation values;

generating a third subset of samples and a fourth subset of samples from the odd numbered samples, such that the third subset of samples are from the first half part and the fourth subset of samples are from the second half part;

correlating the third subset of samples with the second basic sequence to generate a third set of correlation values, and the fourth subset of samples with the third basic sequence to generate a fourth set of correlation values; and determining a frame boundary of the Secondary Synchronization Signal (SSS) frame from maxima and minima in the first, second, third and fourth set of correlation values.

2. The method of claim 1, further comprising:

descrambling the even numbered samples with a 31 length sequence to form the first and the second subset of samples, in that the 31 length sequence is derived from a Primary Synchronisation Signal (PSS);

cyclically shifting the 31 length sequence by a first number of shifts to generate the first reference samples;

cyclically shifting the 31 length sequences by a second number of shifts to generate the second reference samples wherein the first number and the second number corresponds to a position of maximum in the first and second set of correlation values respectively;

descrambling the odd numbered samples in the first half part with the first reference samples to form the third subset of samples; and descrambling the odd numbered samples in the second half part with the second reference samples to form the fourth subset of samples.

3. The method of claim 2, further comprising:

comparing the first number and the second number correspondingly with a third number and a fourth number, in that the third number and the fourth number representing a position of maximum in the third and fourth set of correlation values respectively; and determining a cell group identity of the LTE network from a relation:

$$N_{id}^1 = \frac{(\Delta-1)(62-\Delta)}{2} + m_0,$$

in that $N_{id}^1$ representing the cell group identity, $\Delta$ representing a difference between one of the first number and the third number, and the second number and the fourth number, and the $m_o$ representing the first number.

4. The method of claim 3, further comprising:

selecting the first half part as a start of boundary of the LTE frame when at least one of the conditions, the first number is less than the second number, and the third number is less than the fourth number is satisfied.

5. The method of claim 4, wherein averaging the first, second, third and the fourth set of correlation values over plurality of LTE frames.

6. The method of claim 5, further comprising determining the frame boundary of the SSS frame from the averaged first, second, third and fourth set of correlation values over the plurality of LTE frames.

7. The method of claim 1, further comprising:

descrambling the even numbered samples with a 31 length sequence to form the first and the second subset of samples, in that the 31 length sequence is derived from a Primary Synchronisation Signal (PSS);

descrambling the odd numbered samples in the first half part and in the second half part with a 31 length sequence to form a fifth and sixth subset of samples respectively;

cyclically shifting a basic sequence by a first number of positions to generate a third reference samples;

cyclically shifting the basic sequence by a second number of position to generate a fourth reference samples wherein the first number and the second number corresponds to a position of maximum in the first and second set of correlation values respectively;

descrambling the fifth subset of samples with the third reference samples to form the third subset of samples; and descrambling the sixth subset of samples with the fourth reference samples to form the fourth subset of samples.

* * * * *